Patented Mar. 13, 1951

2,544,827

UNITED STATES PATENT OFFICE 2,544,827

MANUFACTURE OF BIGUANIDE DERIVATIVES

Francis Henry Swinden Curd, deceased, late of Bramhall, England, by Muriel Ruth Curd, executrix, Bramhall, England, and Dora Nellie Richardson, Manchester, England, assignors to Imperial Chemical Industries Limited, a corporation of Great Britain No Drawing. Application July 14, 1949, Serial No. 104,822. In Great Britain August 20, 1948

4 Claims. (Cl. 260—565)

This invention relates to biguanide derivatives and more particularly it relates to the manufacture of biguanide derivatives which are useful as antimalarial agents.

The biguanide derivatives of antimalarial activity with which this invention is concerned are compounds of the formula:

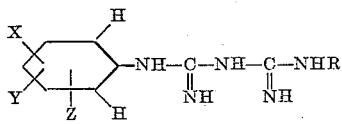

wherein of X, Y and Z, one is chlorine, bromine or iodine and the others may be hydrogen, chlorine, bromine, iodine or lower alkyl radicals of 1–4 carbon atoms, and R is a lower alkyl radical containing more than one and fewer than 8 carbon atoms.

Our invention comprises a process for the manufacture of the said compounds which comprises interaction of a substance of the formula

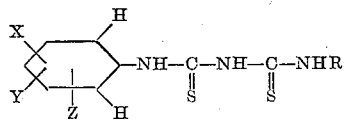

or its S-monoalkyl derivatives, with ammonia, preferably in the presence of a desulphurising agent.

The starting materials may thus be the dithiobiurets of either of the S-monoalkyl derivatives thereof. It will be understood that there are two S-monoalkyl derivatives thereof according as the alkylated sulphur is that adjacent to the nitrogen atom bearing the aryl group or that adjacent to the nitrogen atom bearing the alkyl group. The S-monoalkyl derivative in which the alkylated sulphur is that adjacent to the nitrogen atom bearing the alkyl group, viz. the 1-aryl-5-alkyl-4-alkyldithiobiurets, may be made by interaction of an arylisothiocyanate with an N-alkyl-S-alkylisothiourea, and the corresponding 1-aryl-5-alkyldithiobiuret may be made by thiohydrolysis of the 4-alkyl-derivative. Again the 1-aryl-2-alkyl-5-alkyl-dithiobiurets, viz. those S-monoalkyl derivatives in which the alkylated sulphur is that adjacent to the nitrogen atom bearing the aryl group, may be made by alkylation of the 1-aryl-5-alkyldithiobiurets.

As desulphurising agents which are preferably used in the procees of the invention there are for example the oxides and salts of the heavy metals, particularly those of lead, copper, silver and mercury. Mercuric oxide is particularly suitable.

It may be supposed that the reaction proceeds by stages, the sulphur atoms being replaced stepwise. Thus in the second stage the reaction consists in the interaction of ammonia with a guanylthiourea or with an S-substituted guanylisothiourea, in the presence of a desulphurising agent. This second stage of the process is described and claimed in British Patent No. 603,069.

The process of the invention is brought about by stirring and/or heating the reagents together. Conveniently this is carried out in presence of a solvent or diluent, for example methanol, ethanol or β-ethoxyethanol.

The invention is illustrated but not limited by the following examples in which the parts are by weight.

Example 1

3.15 parts of 1-p-chlorophenyl-5-isopropyl-4-ethylisodithiobiuret, 8.68 parts of mercuric oxide and 50 parts of ethyl alcoholic ammonia, saturated at room temperature, are stirred together at 30–35° C. for 20 hours. The reaction mixture is then filtered and the filtrate is evaporated to dryness under diminished pressure. The residue is extracted with 7% hydrochloric acid, the extract treated with carbon and filtered. The filtrate is made faintly alkaline to brilliant yellow with ammonia to precipitate $N^1$-p-chlorophenyl-$N^5$-isopropylbiguanide hydrochloride which crystallises from water as colourless needles, M. P. 243–244° C. The corresponding base forms colourless rectangular plates from toluene, M. P. 129° C. and the actate, obtained by addition of acetic acid to an acetone solution of the base until the solution is faintly acid to litmus, crystallises from alcohol as colourless needles, M. P. 184–185° C.

The starting material 1-p-chlorophenyl-5-isopropyl-4-ethylisodithiobiuret is prepared in the following manner:

22.8 parts of N-isopropyl-S-ethyl-isothiourea hydrobromide are added to a solution of 5.6 parts of potassium hydroxide in 50 parts of water, followed by 16.8 parts of p-chlorophenylisothiocyanate. The mixture is stirred overnight, filtered and the residue is washed with water, dried and crystallised from light petroleum (B. P. 100–120° C.) and then has M. P. 122–124° C.

By working in a similar manner the following (Examples 2–8) are obtained:

Example 2

$N^1$-p-chlorophenyl-$N^5$-ethylbiguanide, M. P. 113–114° C. from 1-p-chlorophenyl-4-5-diethyl-4- isodithiobiuret. The starting material which is made as described above, by condensation of p-chlorophenylisothiocyanate with N:S-diethylisothiourea hydrobromide crystallises from light petroleum (B. P. 100–120° C.) and has M. P. 110–112° C.

Example 3

$N^1$-p-chlorophenyl-$N^5$-n-propylbiguanide, M. P. 59–60° C. (acetate M. P. 164–165° C.) from 1-p-chlorophenyl-4-ethyl-5 - n - propyl - 4-isodithiobiuret. The starting material is made as described previously from p-chlorophenylisothiocyanate and N-n-propyl-S-ethylisothiourea hydrobromide.

Example 4

$N^1$-p-chlorophenyl-$N^5$-n-butylbiguanide hydrochloride, M. P. 208° C., from 1-p-chlorophenyl-4-ethyl-5-n-butyl-4-isodithiobiuret which has M. P. 77–79° C. and is prepared from p-chlorophenyl isothiocyanate and N-n-butyl-S-ethylisothiourea hydrobromide in the manner described above.

Example 5

$N^1$-p-bromophenyl-$N^5$ - isopropylbiguanide hydrochloride, M. P. 246° C., from 1-p-bromophenyl-4-ethyl-5 - isopropyl - 4 - isodithiobiuret which is made by condensing p-bromophenylisothiocyanate with N-isopropyl-S-ethylisothiourea hydrobromide as described above for the corresponding condensation using p-chlorophenylisothiocyanate and has M. P. 129–130° C.

Example 6

$N^1$-p-iodophenyl-$N^5$-isopropylbiguanide hydrochloride, M. P. 239° C. from 1-p-iodophenyl-4-ethyl-5-isopropyl - 4 - isodithiobiuret which crystallises from light petroleum (B. P. 100–120° C.) and has M. P. 124–125° C. It is prepared by condensation of p-iodophenylisothiocyanate with N-isopropyl - S - ethylisothiourea hydrobromide in aqueous alcoholic alkaline solution.

Example 7

$N^1$-m-chlorophenyl-$N^5$-isopropylbiguanide hydrochloride, M. P. 232° C. from 1 - m - chlorophenyl-4-ethyl-5 - isopropyl - 4 - isodithiobiuret. The starting material may be made by the condensation of m-chlorophenylisothiocyanate with N-isopropyl-S-ethylisothiourea hydrobromide in aqueous alkaline solution and crystallises from light petroleum (B. P. 60–80° C.). It has M. P. 80–81° C.

Example 8

$N^1$-3:4 - dichlorophenyl - $N^5$ - isopropylbiguanide hydrochloride, M. P. 244–245° C. from 1-3':4'-dichlorophenyl - 4 - ethyl-5 - isopropyl - 4-isodithiobiuret which crystallises from light petroleum (B. P. 80–100° C.) and has M. P. 104–105° C. It is obtained by condensation of 3:4-dichlorophenylisothiocyanate with N-isopropyl-S-ethyl-isothiourea hydrobromide in aqueous alkaline solution.

Example 9

2.85 parts of 1-p-chlorophenyl - 5 - isopropyldithiobiuret, 8.68 parts of mercuric oxide and 100 parts of alcoholic ammonia, saturated at room temperature, are stirred together at 30–35° C. overnight. The reaction mixture is filtered and the filtrate is evaporated to dryness under reduced pressure. The residue is dissolved in acetone and the solution is made acid to litmus with acetic acid. There is thus obtained $N^1$-p-chlorophenyl-$N^5$-isopropylbiguanide acetate which has M. P. 184–185° C.

The starting material 1-p-chlorophenyl-$N^5$-isopropyldithiobiuret is prepared as follows:

0.92 part sodium is dissolved in 25 parts of ethyl alcohol and hydrogen sulphide is passed in until the gain in weight is 1.36 parts. This solution is added to a suspension of 6.3 parts of 1-p-chlorophenyl- 4 -ethyl- 5 -isopropyl-4 -isodithiobiuret in 50 parts of alcohol and the mixture is boiled under reflux for 1 hour with the continual passage of hydrogen sulphide through the mixture. The resulting solution is treated with carbon, filtered and acidified with acetic acid. On cooling 1-p-chlorophenyl-5-isopropyldithiobiuret separates and is collected and crystallised from light petroleum. It has M. P. 148° C.

By working in a corresponding manner the following (Examples 10–16) are made:

Example 10

$N^1$-p-chlorophenyl-$N^5$-ethylbiguanide, M. P. 113–114° C., from 1 -p-chlorophenyl-5-ethyldithiobiuret which is prepared by thiohydrolysis, as described above, of 1-p-chlorophenyl-4:5-diethyl-4-isodithiobiuret and has M. P. 158–160° C.

Example 11

$N^1$-p-chlorophenyl-$N^5$-n-propylbiguanide, M. P. 59–60° C., from 1-p-chlorophenyl-5-n-propyl-dithiobiuret which is prepared by thiohydrolysis of 1-p-chlorophenyl-4-ethyl-5-n-propyl-4-isothiobiuret and has M. P. 140–141° C.

Example 12

$N^1$-p-chlorophenyl-$N^5$-n-butylbiguanide hydrochloride, M. P. 208° C., from 1-p-chlorophenyl-5-n-butyldithiobiuret which is prepared by thiohydrolysis of 1-p-chlorophenyl-4-ethyl-5-n-butyl-4-isodithiobiuret and has M. P. 132–133° C.

Example 13

$N^1$-m-chlorophenyl-$N^5$-isopropylbiguanide hydrochloride, M. P. 232° C., from 1-m-chlorophenyl-5-isopropyldithiobiuret which is prepared by thiohydrolysis of 1-m-chlorophenyl-4-ethyl-5-isopropyl-4-isodithiobiuret and has M. P. 128–129° C.

Example 14

$N^1$-p-iodophenyl-$N^5$-isopropylbiguanide hydrochloride, M. P. 239° C., from 1-p-iodophenyl-5-isopropyldithiobiuret, M. P. 136–138° C., which is prepared from 1-p-iodophenyl-4-ethyl-5-isopropyl-4-isodithiobiuret by thiohydrolysis with sodium hydrosulphide in alcoholic solution saturated with hydrogen sulphide.

Example 15

$N^1$-p-bromophenyl-$N^5$-isopropylbiguanide hydrochloride, M. P. 246° C., from 1-p-bromophenyl-5-isopropyldithiobiuret. This is prepared by thiohydrolysis of 1-p-bromophenyl-4-ethyl-5-isopropyl-4-isodithiobiuret and has M. P. 150–152° C.

Example 16

$N^1$-3:4-dichlorophenyl-$N^5$-isopropylbiguanide hydrochloride, M. P. 244–245° C. from 1-3':4'-dichlorophenyl-5-isopropyldithiobiuret which has M. P. 158° C. and is prepared by thiohydrolysis of 1-3':4'-dichlorophenyl - 4 - ethyl-5-isopropyl- 4-isodithiobiuret.

Example 17

2.55 parts of 1-p-chlorophenyl-2-ethyl-5-isopropyl-2-isodithiobiuret, 7.1 parts of mercuric oxide and 50 parts of alcoholic ammonia, saturated at room temperature, are stirred together at 30–35° C. for 20 hours. The reaction mixture is filtered and the filtrate is evaporated to dryness under reduced pressure. The residue is extracted with warm 2 N-hydrochloric acid and the extract is filtered. The filtrate is made faintly alkaline to brilliant yellow with ammonia and a little common salt is added. The precipitated product is filtered off and crystallised from water to give $N^1$-p-chlorophenyl-$N^5$-isopropylbiguanide hydrochloride, M. P. 243–244° C.

The starting material 1-p-chlorophenyl-2-ethyl-5-isopropyl-2-isodithiobiuret is prepared by mixing 8.61 parts of 1-p-chlorophenyl-5-isopropyldithiobiuret, 5.15 parts of ethyl iodide, 150 parts of ethyl alcohol and 3 parts of 0.880 ammonia, and allowing the mixture to stand for 3 days. The resulting solution is evaporated under reduced pressure and the residue is crystallised from light petroleum (B. P. 60–80° C.) to give 1-p-chlorophenyl- 2-ethyl- 5 -isopropyl- 2 -isodithiobiuret which has M. P. 82–84° C.

We claim:

1. A process for the manufacture of biguanide derivatives of the general formula:

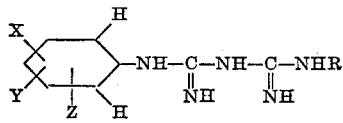

wherein X is a halogen radical of atomic weight greater than fluorine, Y and Z are radicals from the group consisting of hydrogen, halogen of atomic weight greater than fluorine, and lower alkyl having between 1 and 4 inclusive carbon atoms, and R is a lower alkyl radical having between 2 and 7 carbon atoms inclusive, which comprises mixing a substance from the group consisting of those having the general formula:

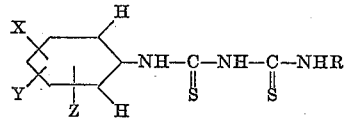

wherein the symbols have the significance stated above, and the S-monoalkyl derivatives thereof, with ammonia, allowing the intermixed materials to react and recovering the biguanide derivative from the reaction product.

2. A process as claimed in claim 1 wherein said intermixed materials are allowed to react in the presence of a desulphurizing agent from the group consisting of heavy metal salts and heavy metal oxides.

3. A process as claimed in claim 1 wherein the reaction between said substance and ammonia is allowed to progress in the presence of an inert solvent.

4. A process as claimed in claim 1 wherein the ammonia is in the form of a solution in an inert solvent when it is mixed with said substance.

MURIEL RUTH CURD,
*Executrix of the Estate of Francis Henry Swinden Curd, Deceased.*
DORA NELLIE RICHARDSON.

REFERENCES CITED

The following references are of record in the file of this patent:

Fromm: Liebig's Annalen, vol. 394 (1912), page 266.

Chemical Abstracts, vol. 32 (1938), page 3399, abstract of Underwood et al., U. Kans. Sci. Bull., vol. 24 (1936), pp. 5–14.